Figure 1:
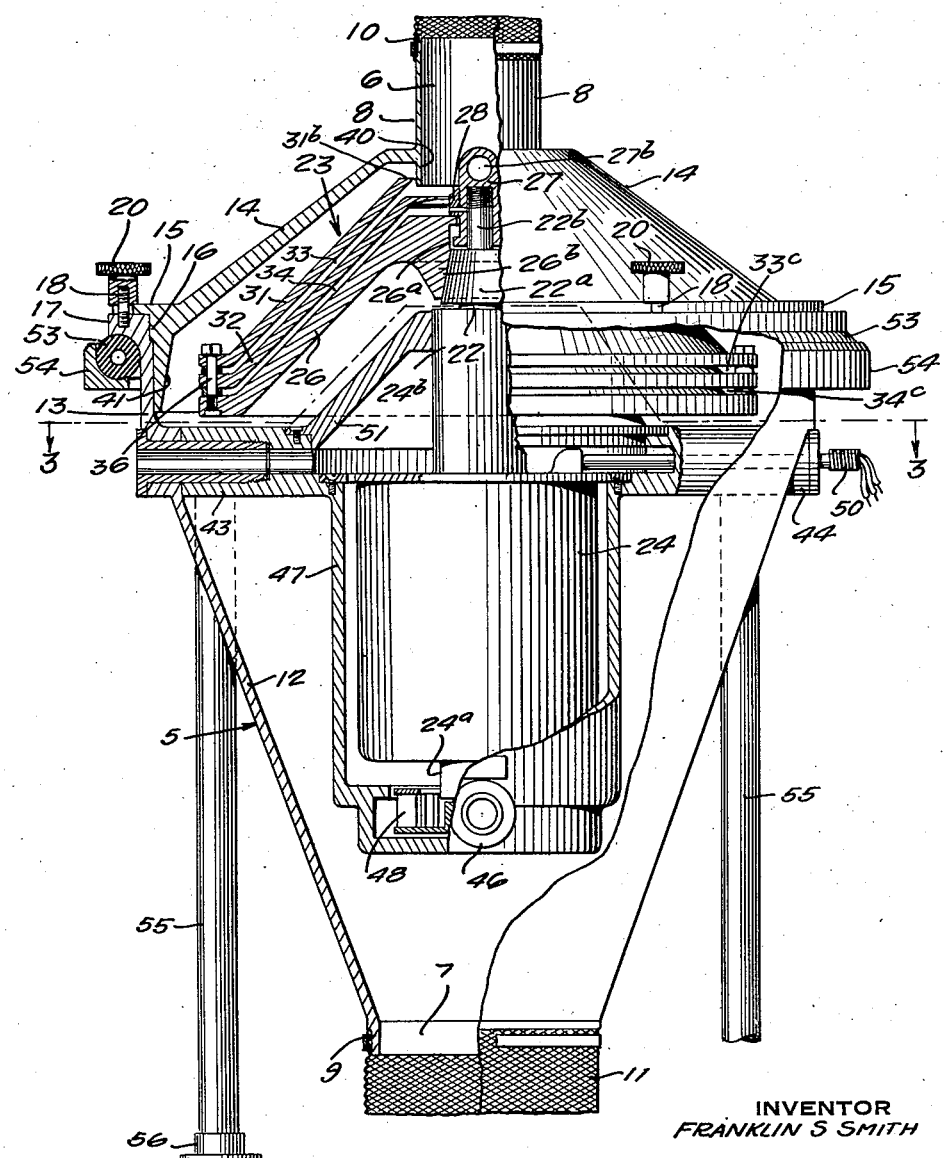

Jan. 18, 1944. F. S. SMITH 2,339,732
APPARATUS FOR DESTROYING INSECT LIFE
Filed March 1, 1940 2 Sheets-Sheet 1

INVENTOR
FRANKLIN S SMITH
BY William D'uienne
ATTORNEY

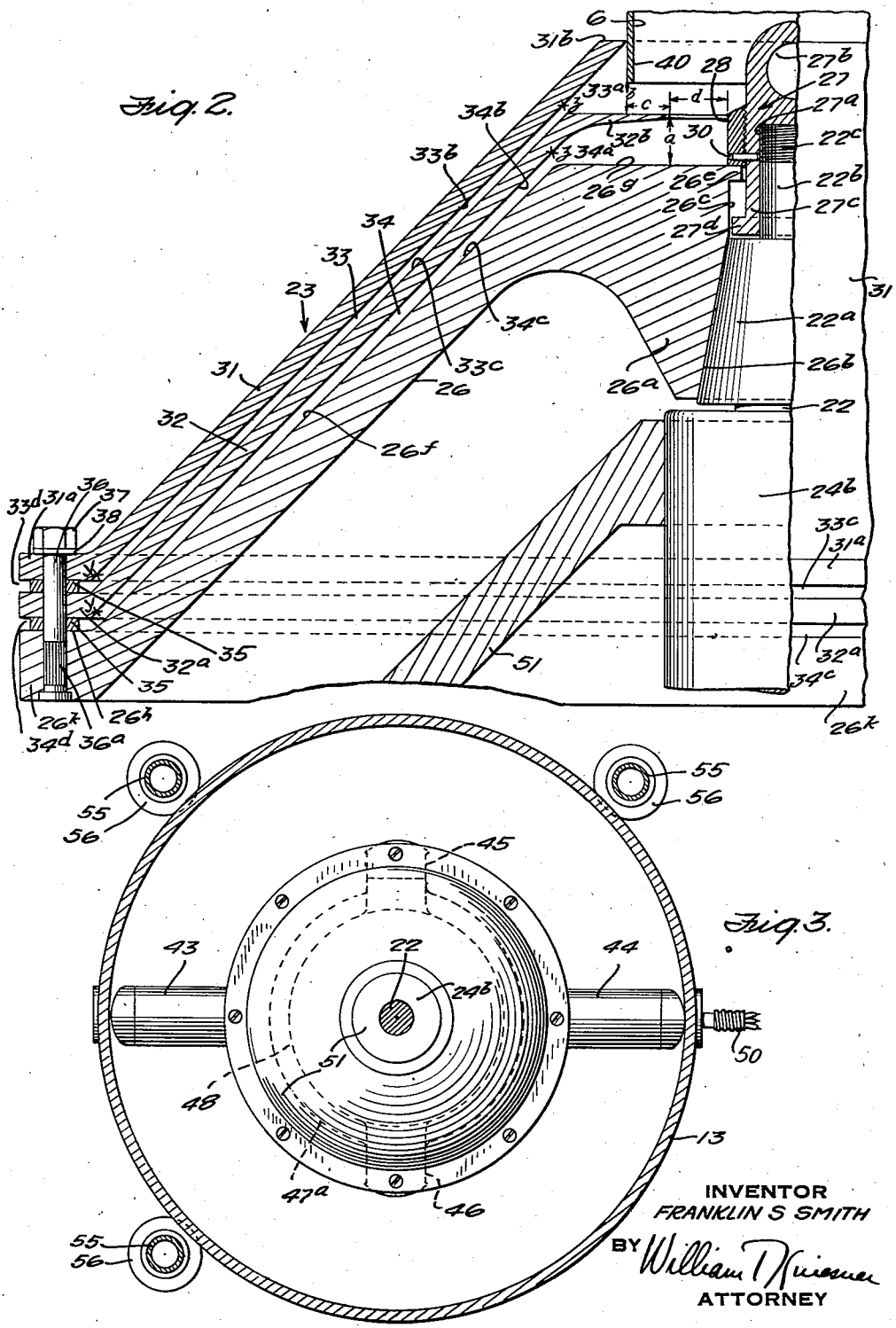

Patented Jan. 18, 1944

2,339,732

UNITED STATES PATENT OFFICE 2,339,732

APPARATUS FOR DESTROYING INSECT LIFE

Franklin S. Smith, New Haven, Conn.

Application March 1, 1940, Serial No. 321,680

11 Claims. (Cl. 21—2)

This invention relates to treating materials and more in particular to a method and apparatus for effecting the destruction of all insect life in a flowable product composed of individual solid parts, such as flour or the like.

One of the objects of this invention is to provide a practical and efficient method and apparatus for destroying the life of insect infestation found in milled food products, such as flour, and usually appearing therein in the form of eggs, larvae, pupae, or adults. Another object is to provide a method of sterilizing such food products that may be inexpensively and efficiently carried on in practice and, more particularly, to provide a method and apparatus for effecting such sterilization that will be capable of being readily and inexpensively incorporated into, or made effective in conjunction with, otherwise usual production or handling in mills of such products.

Another object is to provide an apparatus that will be of rugged and durable construction and of reliable and efficient action in the handling or treatment of bulk milled products, such as flour. Another object is to provide an apparatus of the just stated character capable of functioning, at efficient capacity, in the course of effecting a continuous stream or flow of flour. Another object is to provide a flour-treating apparatus that may be readily interposed or connected into usual production channels employed in the milling, treatment and handling of flour.

Another object is to provide a flour-sterilizing apparatus capable of low cost of maintenance in practical operation. Another object is to provide an apparatus for effecting treatment of flour constructed to bring about a dependable and rugged assemblage of the various parts of the apparatus and characterized by facility of assembly or disassembly. Another object is to provide a flour-treating apparatus capable of operating at high peripheral velocities with safety and dependability.

Another object is to provide a simple, practical, and efficient method for effecting destruction of the life of insect infestion and capable of being carried on at rates suitable to the rates of production of milled products, such as flour. Another object is to provide a reliable apparatus for destroying the life of insect infestation in bulk materials like milled products, such as flour, and well adapted to meet the varying requirements met with in practical milling operations. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which is shown one of the various possible embodiments of the mechanical features of my invention, Figure 1 is a front elevation of the apparatus with certain of the parts broken away and other parts shown in central vertical section;

Figure 2 is a fragmentary view on an enlarged scale of a portion of certain of the parts shown in Figure 1, and Figure 3 is a horizontal sectional view as seen along the line 3—3 of Figure 1.

Similar reference characters refer to similar parts throughout the several views in the drawings.

Referring first to Figure 1, I preferably provide a casing-like structure generally indicated by the reference character 5 provided with inlet and outlet passages preferably at the upper and lower ends, respectively, as indicated at 6 and 7, formed as by flanges 8 and 9, respectively, preferably alined along the vertical axis of the casing structure 5 and by means of which the apparatus may be connected or interposed at any suitable point into the usual production equipment or routine employed in the milling of products like flour. Such connections may be made, for example, as by suitable lengths of tubular conduit 10 and 11, preferably made of any suitable flexible material, like fabric, cloth, or the like, and having their respective ends secured in any suitable manner, as by external fastening bands, as indicated in Figure 1, respectively to the flanges 8 and 9.

The casing structure 5 is preferably built up in several sections and is provided with suitable means for supporting it, as later described. Thus, the casing structure 5 preferably comprises a lower section 12 preferably generally frusto-conical in shape, terminating at its lower end in the above-described flange 9 that forms the exit passageway 7, and terminating or merging at its upper end into a generally cylindrical portion 13. A companion or upper casing section 14 is also preferably frusto-conical, terminatng at its upper end in the annular flange 8 which forms the above-described inlet passageway 6, and shaped or constructed at its lower end to interfit with and to be secured preferably detachably to the lower casing section 12. Thus, upper casing section 14 may have a peripheral flange 15 to rest against the upper face of the cylindrical portion 13 and a cylindrical part 16 preferably of relatively short axial extent to interfit snugly within the upper end of the cylindrical portion 13 of the lower casing section.

The upper end of the cylindrical portion 13 is flanged or of increased thickness peripherally and in an outward direction, as at 17, and distributed suitably about the upper face of the part 17 are securing or clamping devices to hold the casing sections together; thus, these securing devices may each comprise a threaded stud 18 threaded into the part 17 and extending through suitable holes or slots in the flange 15 so that a nut 20, when tightened down upon the threaded stud 18, may securely clamp the flange 15 between itself and the part 17.

Within the casing structure 5 is supported a shaft 22 preferably with its axis coincident with the vertical axis of the companion frusto-conical sections 12 and 14 of the casing structure 5 and it is about the axis of shaft 22 that I prefer to rotate the rotating parts of the apparatus, preferably arranging the shaft 22 and the rotary flour-treating unit so that the latter is supported and driven by the shaft. Where, as in the preferred case, it is desired to rotate the flour-treating unit, indicated generally by the reference character 23, electrically, shaft 22 may and preferably does comprise the shaft of an electric motor, such as a polyphase alternating current induction motor, of which only the casing is shown in Figure 1, being generally indicated by the reference character 24. The internal construction of this motor may take any usual or suitable form; it usually comprises a stationary field or stator structure, usually internally of the casing 24, and a suitable rotor or armature structure carried by the internal portion of shaft 22. The latter is rotatably carried by the casing 24 by any form of bearings, such as combined radial and thrust antifriction bearings, preferably mounted in end extensions 24ª and 24ᵇ of the casing 24. Motor casing 24 is mounted within the casing structure 5 in a preferred manner later described.

Flour-treating unit 23 comprises a main carrier member 26 preferably and illustratively substantially frusto-conical and suitably formed at its center to provide a hub 26ª by which it is fitted to and coaxially secured to the shaft 22, the latter having a tapered portion 22ª with which a correspondingly tapered bore 26ᵇ of the hub 26ª interfits.

Any suitable means may be provided to secure the carrier member 26 to the shaft 22 but preferably in a manner to permit ease of assembly and disassembly. A preferred means for this purpose may comprise the arrangement better shown in the enlarged scale of Figure 2. Thus, the upper end of shaft 22 has a cylindrical or reduced end portion 22ᵇ threaded as at 22ᶜ for coaction with the internally threaded portion 27ª of a sleeve-like part 27 having its upper portion shaped to form an eye 27ᵇ and having its lower unthreaded portion 27ᶜ provided with an external peripheral flange 27ᵈ of an external diameter slightly less than the diameter of the cylindrical bore 26ᶜ of the hub 26ª; the upper end of the bore in the hub 26ª is formed to provide an inwardly directed lip 26ᵉ extending peripherally and having an internal diameter less than the external diameter of the carrier member 26. Thus, the sleeve and eye member 27 may be assembled to the hub of the carrier member 26 by entering the eye-end through the bore of the hub from the larger end of the bore, and thereafter a collar 28 is secured to the sleeve member, as by threading it onto the latter, as indicated in Figure 2, and locking it against rotation as by a pin 30, the relationship of the several parts being substantially as is better shown in Figure 2.

Accordingly, by means of the eye 27ᵇ, the sleeve member 27 may be easily and with adequate force turned to thread its threaded portion 27ª onto the threaded portion 22ᶜ of the shaft 22 and thus, through the engagement of the external collar 28 with the upper end of the hub 26ª, force and hold the tapered bore portion 26ᵇ of the hub portion 26ª into engagement with the correspondingly tapered part 22ª of the shaft 22. The carrier member 26 is thus assembled to the shaft 22 with accuracy and with coincidence of the axes of the two parts assured. And as is later pointed out, this preferred arrangement also facilitates disassembly and handling.

In the preferred or illustrative form, the carrier member 26 supports or has related to it one or more members to provide a corresponding number of spaces adjacent the hub for the reception of flour. These spaces are open or exposed externally, preferably peripherally, for the discharge of flour. The walls of the spaces have a configuration suitable to the speed of rotary drive of the flour-treating unit, all as is illustratively set forth below, this is to assure a flow of the flour and the destruction of such insect life as may be in the flour. For purposes of illustration, I have shown in Figures 1 and 2 two elements 31 and 32 related to the carrier member 26 to provide two spaces 33, 34, and in the preferred construction the surfaces defining or bounding the spaces 33, 34 are frusto-conical.

A preferred and convenient manner of building up the flour-treating unit is shown in Figure 2. Thus, the carrier element 26 is shaped to provide a frusto-conical outer surface 26ᶠ merging at its upper end into a face or surface 26ᵍ which, in the illustrative form, is annular and has its plane at right angles to the axis of rotation. At its outer and lower end the frusto-conical surface 26ᶠ merges into an annular surface 26ʰ, the plane of which is preferably at right angles to the axis of rotation, being conveniently formed by an annular flange-like peripherally extending extension 26ᵏ of the carrier member 26.

Element 32 is also frusto-conical in shape, terminating at its lower and peripheral portion in an annular flange 32ª dimensioned to overlie the corresponding annular flange extension 26ᵏ of the carrier member 26. In generally like manner, as many other elements as may be desired, such as the element 31, are similarly provided with annular flange-like extensions, such as the extension 31ª. By suitable spacer means, such as washers 35 of suitable thickness and preferably of stainless steel, the various frusto-conical elements are related to each other in appropriate spacing. Thus, elements 31 and 32 are superimposed upon each other and upon the flange extension 26ᵏ of the carrier element 26, and are alined by bolts or studs 36 which accurately fit holes in the superimposed peripheral flanges and in the washers 35; the parts are all held together, as by the clamping action of a nut 37 on the stud, a suitable number, illustratively eight, of such bolt or stud and spacer means being employed and equidistantly spaced about the periphery.

In a preferred structural arrangement of the just described character for mounting the elements 31, 32 onto the carrier element 26, the studs 36 are preferably initially fitted or secured to the carrier element 26 in a manner to prevent turning, as, for example, by knurling or ribbing a portion of the bolt shank that is accommodated in the hole in the flange 26ᵏ, as at 36ª, or otherwise shaping or dimensioning that portion of the shank relative to the hole to form therewith a push fit, suitable provision being preferably made, as indicated in Figure 2, for countersinking the head of the bolt or stud so as to leave the under face of the flange $26^k$ smooth and free from projecting parts or other irregularities.

With the desired number of bolts 36 thus assembled to the carrier element 26, and uniformly distributed about the axis of rotation, the washer-like spacers and the elements 32 and 31 may be in effect strung onto the stud bolts, whence the nuts 37 may be appropriately tightened up and locked, as by a lock washer 38.

With the carrier element and the superimposed elements, like the members 32 and 31, accurately machined, they may, in the above-described manner, be reliably assembled with coincidence of their axes.

With the structural arrangement thus far described, the annular flange 8 (Figure 1) which forms the entry opening or passageway, is preferably coaxial with the axis of rotation of the flour-treating unit and preferably I provide suitable means for substantially equally or uniformly distributing to the entry ends of the spaces 33, 34 the flour or other product that is fed or supplied to the apparatus through the inlet passageway 6. Thus, I shape the element 32 at its inner and upper end to merge the latter into an annular flange-like portion $32^b$, preferably of tapering cross-section and overlying the annular face $26^g$ of the carrier element 26, its inside or smaller diameter being greater than the outside diameter of the axially extending structure 27—28 but less than the inside diameter of the conduit extension 40. The outermost element 31 terminates at its upper inner portion, as at $31^b$, to encircle or encompass the extension 40 of flange 8 some distance upwardly from its lower end preferably with a small clearance therebetween.

With such an arrangement, proportioned substantially as is indicated in Figure 2, flour entering the apparatus through the passageway 6 is substantially equally distributed into the annular mouth-like entry ends $33^a$ and $34^a$ of the spaces 33 and 34, respectively. This preferred proportioning of the parts to effect such uniform distribution, may be substantially as follows: The effective area of the entry end or mouth $33^a$ and the effective area of the mouth $34^a$ are made substantially equal, the former having a lesser dimension in an axial direction, as indicated at B in Figure 2, than the latter whose axial dimension is indicated at A, in inverse proportion to their respective radii. Thus, flour moving in an outward direction away from the axis of rotation finds the entry ends or effective mouth openings of the several spaces substantially equal.

Flour flowing downwardly through the conduit extension 40 enters the flour-treating unit in a stream which in a general sense is of annular cross-section due to the presence of the generally cylindrical structure 27—28 being coaxially related to the conduit extension 40. This downwardly moving annularly cross-sectioned stream of flour is broken up into two annular portions of substantially equal volume. The annular flange part $32^b$ of the element 32 presents an annular portion underlying the conduit extension 40 of a radial dimension $c$, as shown in Figure 2, thus to cut off a corresponding part of the downwardly flowing flour to be entered into the mouth $33^a$ and the space 33, while the rest of the downwardly moving stream passes through the annular gap of radial dimension $d$ for entry into the mouth $34^a$ of the treatment space 34. The radial dimensions $c$ and $d$ are so proportioned that the respective annular areas are substantially equal.

Accordingly, with the apparatus operating at suitable speeds, as indicated hereinafter, a portion of the flour flowing downwardly out of the conduit extension 40 discharges through the annular gap between the flange part 32 and the ring member 28 onto the face $26^g$ of the carrier member 26, while an equal portion of the flour flowing down out of the conduit extension 40 is intercepted by the flange extension $32^b$ of the member 32; but the faces or surfaces which thus intercept the flour are rotating at such speeds as to cause the flour to exert sufficient centrifugal force to move it into the entry ends or mouths $33^a$ and $34^a$ and thence into the spaces 33 and 34, respectively, but with substantially uniform or equal distribution of flour among the several spaces. Accompanying the flour or other product to be treated into the spaces 33 and 34 is the insect life with which the flour or other product happens to be infested.

Due to the centrifugal force exerted by the moving flour and by its insect infestation, they move in an outward direction and hence against the interior faces $33^b$ and $34^b$ (Figure 2) that form the outer bounding surfaces of the spaces 33 and 34, respectively, engaging these faces at points $z$, $z$, as indicated in Figure 2.

Preferably, the radial dimension of each treatment space where the flour enters it, as at the point $z$, is suitably proportioned to limit the radial dimension or thickness of the layer of flour that may be laid against the faces $33^b$ and $34^b$ and, illustratively, that radial dimension of the spaces 33, 34 at about the points $z$, $z$ in Figure 2, may be about 1/8". With flour with its insect infestation thus moved by the centrifugal force exerted by it against the faces $33^b$ and $34^b$, as at the points $z$, $z$, but uniformly distributed about the entire circular extent through the points $z$, $z$, the configuration of the surfaces $33^b$ and $34^b$ effects a control of the variation in centripetal force acting upon the flour and its infestation and due to the centrifugal force exerted by the flour and its infestation, the latter move outwardly and downwardly relative to these faces $33^b$ and $34^b$ in expanding curvilinear paths about the axis of rotation of the flour-treating unit. Thus, a steady downward and outward flow may be effected in each treatment space, along the outer bounding surface or face of the latter, such as along the faces $33^b$ and $34^b$, progressing the flour toward the peripherally open discharge ends of these spaces formed by the spaced flange portions $26^k, 32^a, 31^a$. As these actions proceed, the companion bounding faces of each treatment space, such as the faces $33^c$ and $34^c$, are effective to aid in forcing the material to progress, in the manner above described, along the faces $33^b$ and $34^b$; for example, should any particles of flour, insect infestation, or the like, detach itself for some reason from the layer of material progressing along the surface $33^b$ or $34^b$, the juxtaposed surface, such as surface $33^c$ or $34^c$, rotating as part of the unit, catches such detached particles or otherwise sets them into motion at high velocity, thus to cause them to exert a sufficient centrifugal force to move them outwardly and in a direction toward the surface $33^b$ or $34^b$, as the case may be, thus to rejoin the layer of material that is being progressed downwardly and outwardly along the outer bounding surface or surfaces of the treatment space or spaces.

The dimension or thickness of the treatment space, illustratively 1/8" at its upper end, as at the points $z$, $z$ of Figure 2, may be the same throughout its entire extent and for greater simplicity and convenience of construction is preferably of uniform thickness throughout, thus permitting the making of the frusto-conical portions of members 31, 32 and 26 (Figure 2) of uniform thickness throughout, though, as will later become clearer, the thickness of the space need not be uniform throughout.

The thickness of the treatment spaces, such as space 33 or space 34, is greater than the maximum dimension of the form of insect life to be destroyed, thus to provide an unrestricted passageway for the flow of the product therethrough. While, therefore, in this illustrative manner of carrying out my invention, the treatment spaces are of sufficient dimension to permit the free passage therethrough of various forms of insect infestation, nevertheless such insect life in all forms, has its life destroyed prior to reaching the exit end of the treatment space. In this connection, the parts are dimensioned and the speed of drive selected to be sufficiently high so that the movement communicated to the forms of insect infestation, while moving along the surface $33^b$, for example, in paths of increasing radius, is at such high velocity that the centrifugal force exerted by the form of insect life presses it against the surface at such pressure as to effect a destructive crushing or deformation. Due to the increasing radius of the path of movement, the linear velocity increases and the pressure or force of insect life correspondingly increases.

By way of illustration, the diameter of the surfaces $33^b$ and $34^b$ at about the points $z$ may be about 7" and the diameter at their lower and outer ends as at the points $y$, $y$ may be about 21". The angle of inclination of these frusto-conical surfaces relative to the axis of rotation may be on the order of 45°. Illustratively the speed of drive of the flour-treating unit may be on the order of 3450 R. P. M. Assuming these illustrative factors, a particle, such as a stage of insect life, moved with the flour particles against one of these surfaces as at the point $z$, by the actions earlier described above, is at the beginning of its path of movement along the surface; such path is in a general direction toward the point $y$, but because of the configuration of the surface and the actions that take place, its actual path of movement is a composite of a spiral and a helix. Relative to the supporting surface, the particle partakes of movement which is the resultant of movement circumferentially and of movement in the direction of radius increase. Excepting for slippage circumferentially, a particle, if deposited onto the surface at point $z$, would be put into movement at a linear velocity which, in view of the radius at that point and the speed of rotation, is sufficient to cause the particle to exert a centrifugal force of about 1200 times gravity. The exerted force, however, and the slope or radius increase of the surface, start the particle moving also in the direction of radius increase. In the course of such movement, its radial distance from the axis of rotation increases and the centrifugal force exerted by it correspondingly increases and by the time it reaches point $y$ its linear velocity in its movement through its curvilinear path causes it to exert an increased centrifugal force, which, excepting for slippage, would be on the order of 3500 times gravity. By changing the radial dimensions, as at the points $z$ and $y$, the increasing centrifugal forces exerted as it continues along its curvilinear path may be varied according to circumstances and as desired. As a general guide the known formula, namely, centrifugal force times gravity equals peripheral velocity squared divided by the product of the radius and the acceleration of gravity, may be used.

As just indicated, the progression of any particle toward the point $y$ moves it through regions of progressively increasing radius. The mass of particles of flour and insect infestation therein, entering each space at the point $z$ in a layer, the thickness of which is limited by the spacing at the point $z$ and which, as above indicated, may be on the order of 1/8", accordingly becomes progressively thinned out in the thickness of its layer as it progresses toward the point $y$. Thus, if the radius at point $y$ is 3 times the radius at point $z$ and assuming a layer thickness at point $z$ of about 1/8", the maximum thickness of layer at point $y$ is 1/9 of 1/8" since also the velocity at point $y$ is 3 times the velocity at point $z$.

Aside from the just-mentioned action, a general compacting of the flour also takes place, entrained air being separated from the flour particles. And also, as earlier above-mentioned, should any particle, such as flour particles or form of insect infestation, leave the layer-like mass of material moving along the surface, such as surface $33^b$, their movement would be toward the opposed surface $33^c$ bounding the space, by which their velocity of movement would be increased or restored to a value such that they again set up centrifugal forces to move them outwardly and thus restore them, thus insuring the treatment in the above-described manner of the various forms of insect infestation.

Thus, any form or stage of insect infestation which might start its progression from point $z$ toward point $y$ cushioned by particles of flour interposed between it and the surface, such as surface $33^b$, along which the mass moves, relatively quickly finds itself making substantially direct contact with the surface as a result of this thinning-out action that takes place, and accordingly the centrifugal force exerted by the stage of insect life presses it directly against the surface. Thus, the destructive action of the pressure is enhanced and also an abrading or rubbing of the stage of insect life against this surface comes into action to take part in effecting destruction of life therein; such destruction may be said to inflict lethal trauma on all insect life in the product flowing through the spaces 33 and 34. These actions take place, as above indicated, throughout curvilinear paths, and the actual path of movement of any such particle relative to the surface toward and against which it is forced may thus be longer than the distance from point $z$ to point $y$. The angle of inclination of the treatment surface relative to the axis of rotation may, of course, be varied or changed in relation to other factors, such as the speed of rotation, maximum and minimum radii, according to the material to be treated, the character of insect life therein, the rate at which it is desired to move the product through the treatment unit, and the like, due regard being had, of course, to insuring that the stages of insect infestation exert sufficiently high centrifugal forces to bring about the life-destroying action, like those above described.

The material reaching points y and comprising the particles of the product, such as flour, and the forms of insect infestation now with their life extinguished and probably also broken up, due to the rubbing or abrading action, discharges peripherally in a general tangential direction, the centripetal and centrifugal forces collapsing; such discharge takes place through the peripherally open ends 33ᵈ and 34ᵈ of the spaces 33, 34, these spaces being interrupted only by the peripherally spaced spacers or washers 35, 35, into the upper portion of the casing structure and preferably against a relatively heavy downwardly and peripherally extending flange 41 preferably formed integrally as part of the upper casing portion 14; this flange 41 preferably presents a downwardly and outwardly inclined and hence substantially frusto-conical surface to the discharging particles which guide or deflect the particles downwardly into the frusto-conical casing section 12, the interior walls of which guide it to the discharge opening 7 whence, by the conduit 11, it is guided away from the apparatus.

Preferably, the treatment surfaces against which the material with its insect infestation is forced and along which it is moved, are constructed to resist wear and preferably also corrosion and in a preferred construction the members 31 and 32 and preferably also the carrier member 26 are made of a suitable aluminum alloy, preferably in the form of forgings, and their surfaces are anodized, thus to give them a high degree of hardness and good resistance to wear. Other parts of the apparatus subjected to the flow under substantial force of the product undergoing treatment may likewise be constructed to have high resistance to wear and thus, for example, casing sections 12 and 14 may be anodized aluminum alloy as well. When made of anodized aluminum alloy, which resists corrosion, gases which might be present with the product being treated and which might have strong corrosive action on metals, are thus prevented from producing harmful effects.

The rotating flour-treating unit is preferably dynamically balanced but since unbalanced conditions might arise during operation of the apparatus, due, for example, to non-uniform distribution of the material being handled by the rotary treating unit, I prefer to provide an arrangement that permits the rotating mass to assume as a center of gyration the center of gravity of the rotating mass and its unbalanced load. Preferably, the parts are so proportioned that the upper bearing of shaft 22, within the housing extension 24ᵃ, is at the center of gravity of the rotary treating unit, thus to avoid shaft deflection. Motor casing 24 is, in one possible arrangement, rigidly secured to the casing section 12 as, for example, by two diametrically opposed bracket structures 43 and 44 adjacent the upper end of motor casing 24 and two diametrically opposed bracket structures 45, 46 at the lower end of the casing structure, the two pairs of brackets 43—44 and 45—46 extending along diameters at say 90° to each other. Preferably, the motor is air-cooled and hence is provided with an outer jacket or casing 47 to and within which the motor frame 24 is secured in any suitable manner, and in such case the above-described brackets are preferably related to the jacket and may in part be formed integrally therewith, the brackets or supports being preferably hollow or tubular, as is indicated in Figure 1, with respect to the supporting bracket 43. Thus, the latter may serve as an inlet for air which is drawn into the space between the motor frame 24 and the jacket 47 by an air impeller 48 accommodated in the lower portion of the jacket structure and secured to and driven by the lower end of shaft 22, bracket supports 45 and 46 serving as outlets for the discharge of the air which, in its path of travel, absorbs heat losses in the motor dissipated through the motor casing 24. Through tubular or hollow bracket support 44 the insulated conductors, generally indicated at 50 in Figures 2 and 3, may be passed to connect the motor to a suitable power circuit. For details of this form of air-cooled motor structure and mounting, reference may be had to my co-pending application, Serial No. 296,544, filed September 26, 1939.

Thus, a rigid and dependable mounting of the shaft 22 to the lower casing section 12 may be achieved, it being noted that I preferably provide a member 51 (Figures 1 and 2) generally frusto-conical in shape to form part of the jacket 47 but constructed to interfit at its lower and outer end with the upper circular portion 47ᵃ of the jacket structure 47 and at its upper and inner end with the extension of the motor casing 24 within which the upper end bearing for shaft 22 is positioned, member 51 thus acting as a strong and rigid brace to support this upper bearing and to transmit to the casing structure 12 strains or thrusts which the shaft might exert radially.

The peripheral flange portion 17 of the casing section 12 is concaved on its under face to provide a continuous peripheral seat for a resilient or cushioning member 53, preferably of rubber and preferably made in tubular form and sufficiently thick-walled to give the desired resiliency of action. This cushioning member 53 rests in an upwardly concaved continuous seat formed in a ring-like frame member 54 to which at suitably spaced points are secured vertically extending legs or standards 55, illustratively 4 in number (Figures 1 and 3) and provided at their lower ends with suitable flange means 56, by which they may be secured to a suitable supporting surface, such as the floor.

The horizontal median plane through the cushioning member 53, which thus forms a resilient or yielding support for the entire casing and the apparatus mounted thereon, is at or slightly above the center of gravity of the rotating parts, such as the treating unit 23, the shaft 22 and the rotor of the motor 24.

With the rotating parts constructed and assembled or otherwise dynamically balanced, any condition of unbalance arising during the operation of the apparatus is prevented from overstressing parts rotating at high peripheral velocities and from causing damage or unsafe vibration. When the rotating mass becomes dynamically unbalanced, the yieldability of the member 53 permits such a shifting of the axis of the entire apparatus that is thus supported from the frame member 54 as corresponds to a precessional motion, the extent of which, however, is limited by the resilience of the member 53. This precession is stable because the center of gravity of the rotating parts is coincident with or slightly below the plane of the effective support provided by the resilient member 53 which, by its resistance, retards the precession and ultimately completely negatives it, restoring the rotating mass to a position with its axis in normal position. The yieldability and resiliency of the member 53 also tend to prevent the transmission of vibration to the frame structure 54—55. The resilient mounting thus permits the rotating parts and the load represented by the material undergoing treatment to assume, as a center of gyration, the center of gravity of the rotating parts with the load.

Should access to the interior of the apparatus be needed, the top casing section 14 may be readily removed upon disengaging the securing devices 20 so as to release the top casing section. With the casing structure thus opened, access to the apparatus within the casing is easily gained. The flour-treating unit 23 may be easily removed, the eye portion 27b of the sleeve member 27 permitting the latter to be readily turned to unthread it from the threaded portion 22c of the shaft, thereby withdrawing the collar 28 from engagement with the hub portion 26a of member 26, whence the treating unit may be raised or lifted out of the apparatus by means of the eye member 27b, the collar or flange 27d engaging under the flange 26e so that the flour-treating unit is carried upwardly with the eye and sleeve member 27. The taper of the bore 26b and of the shaft portion 22a may be of such an angle as to permit ready separation of the one from the other. The members 31, 32 may be easily removed from the carrier member 26 or disassembled from each other.

Thus, it will be seen that there has been provided in this invention a method and apparatus in which the various objects hereinbefore noted, as well as many thoroughly practical advantages are successfully achieved. The apparatus is of a thoroughly practical character and is well adapted to meet the conditions of long and hard practical use. For example, in the matter of maintenance, the spaces adjacent the respective surfaces against which the stages or forms of insect infestation are pressed and their life destroyed, as above-mentioned, can be made of comparatively large dimension or thickness, illustratively on the order of ⅛", as compared to a maximum thickness of forms of the insect life to be killed, thus also lessening the possibility of clogging of the spaces. Though the bounding surfaces of the spaces 33, 34 are, in the illustrative form, shown to be parallel to each other, they may be at an angle to each other either in converging or diverging direction from the point z toward the point y, or either or both may take on other than the straight-line or frusto-conical shape, either or both being curved, if desired. Such factors as these may be varied in relation to each other and to such factors as speed of drive, maximum and minimum radii, rate of change of radius therebetween, and others, to achieve suitable or desired relationships between the forces exerted, the rate of movement or of slip relative to the supporting surface, and the like, all as will be clear in view of the illustrative embodiment above described. Thus, for example, the above-stated values for exerted centrifugal forces at points z and y are illustrative and approximate, and by changing such factors as just stated, these values may be changed to suit any desired circumstances and similarly the rate of change of the exerted forces during progression of a particle or stage of insect life from entry to exit likewise suited to circumstances. Thus, also, the force with which it is rubbed or abraded against the surface and its rate or speed of rubbing movement therealong may be changed according to circumstances. Also, the number of surfaces, like the surfaces 33b and 34b, may be varied as desired and according to the desired capacity of the apparatus; with two such surfaces as in the illustrative form, the capacity may be on the order of 200 pounds of flour per minute.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. In apparatus for effecting the destruction of all insect life in a flowable product composed of individual solid parts, the combination of, product-directing means, a frusto-conical rotary treating device having an interior treating surface of a form generated by the rotation of a straight line about the axis of rotation, said device having a central inlet adapted to receive the product from said product-directing means so that the product is directed along said treating surface, said product-directing means and said inlet forming a substantially unrestricted passageway to allow a substantially even stream of said product to flow freely to said treating surface, and means to rotate said treating device at a speed to cause the product to move along said interior treating surface and to be pressed thereagainst during such movement to inflict lethal trauma on all insect life in said product.

2. In apparatus for effecting the destruction of all insect life in a flowable product composed of individual solid parts, the combination of, product-directing means, a rotary treating device comprising two substantially frusto-conical members mounted with coextensive surfaces and maintained in spaced relationship to provide a frusto-conical treatment space therebetween, said treating device having a central inlet portion located to receive the product from said directing means and a peripheral outlet, said product-directing means and said central inlet forming a substantially unrestricted passageway to allow a substantially even stream of said product to flow freely to said treatment space, and means to rotate said treating device at a speed to cause the product to move through said treatment space and be pressed against the inner surface of the exterior frusto-conical member to inflict lethal trauma on all insect life in said product before leaving said treating device through said peripheral outlet.

3. In apparatus for effecting the destruction of all insect life in a flowable product composed of individual solid parts, the combination of, product-directing means, a rotary treating device including three substantially frusto-conical members mounted with coaxial surfaces and maintained in spaced relationship to provide two concentric treating spaces therebetween, said treating device and said product-directing means forming a product-dividing means to divide the stream of said product into two streams and direct one of said streams into each of said treating spaces and to thereby form a substantially unrestricted passageway through which said product passes, and means to rotate said treating device at a speed to cause the product to move along said interior surface of said treating device to be pressed thereagainst during such movement to inflict lethal trauma on all insect life in said product.

4. In apparatus for effecting the destruction of all insect life in a flowable product composed of individual solid parts, the combination of, product-directing means, a rotary treating device having three substantially frusto-conical members spaced to provide spaces therebetween, said device being positioned to receive the product from said product-directing means and having a peripheral outlet, the middle member extending further toward the axis of the treating device than the outer member to divide the flowing product into two streams and to direct one stream of said product into each of said spaces between said members, and means adapted to rotate said treating device at a speed to cause the product to move through said spaces and be pressed against said members with a force to inflict lethal trauma on all insect life in said product.

5. Apparatus as described in claim 1 wherein said rotary treating device is provided with a plurality of similar treating plates each of which has an interior treating surface, said plates having radially extending peripheral flanges which are rigidly held in spaced relationship and which thereby provide rigid support for the plates.

6. Apparatus as described in claim 2 wherein said rotary treating device has a supporting and spacing means at the periphery of said interior treating surface.

7. In apparatus for effecting the destruction of all insect life in a flowable product composed of individual solid parts, the combination of, product-directing means, a rotary treating device having a plurality of spaced parallel plates the space between which is the treatment zone, said treating device having an inlet adapted to receive the product from said product-directing means so that the product is directed through said treatment zone, said product-directing means and said inlet forming a substantially unrestricted passageway to allow a substantially even stream of said product to flow freely to said treatment zone, and means to rotate said treating device at a speed to cause said product to move along the surface portions within said treatment zone and to be pressed thereagainst during such movement to inflict lethal trauma on all insect life in said product.

8. In apparatus for effecting the destruction of all insect life in a flowable product composed of individual solid parts, the combination of, product-directing means, a rotary treating device having an interior frusto-conical treating surface which extends from a product inlet radially and axially to a product outlet and is of a form generated by movement of a straight line about the axis of rotation, said inlet being adapted to receive the product from said product-directing means so that the product is directed along said treating surface, said product-directing means and said rotary treating device forming a confining passage through which the product passes and to which it is confined formed by an assembly of stationary and moving product-confining surfaces, all of said stationary surfaces extending downwardly at an angle which allows said product to flow freely by gravity and all of said moving surfaces extending away from the center of rotation at an angle to permit said product to flow freely along or away from said moving surfaces, said confining passage being substantially unrestricted to allow a substantially even stream of said product with the insect life therein to flow freely through and away from said treating surface, and means to rotate said treating device at a speed to cause the product to move along said treating surface and to be pressed thereagainst during such movement to inflict lethal trauma on all insect life in said product.

9. In apparatus for effecting the destruction of all insect life in a flowable product composed of individual solid parts, the combination of, product-directing means, a rotary treating device having three spaced parallel plates to provide two treatment spaces therebetween, said treating device having an inlet shaped and positioned to receive the product from said product-directing means and direct it in two substantially equal streams through said treatment spaces, said product-directing means and said inlet forming a substantially unrestricted passageway to allow two substantially even streams of said product to flow freely through said treatment spaces, and means to rotate said treating device at a speed to cause said product to move along the surface portions within said treatment spaces and to be pressed thereagainst during such movement to inflict lethal trauma on all insect life in said product.

10. In apparatus for effecting the destruction of all insect life in a flowable product composed of individual solid parts, the combination of, product-directing means, a rotary treating device having three spaced parallel plates to provide two treatment spaces therebetween, said treating device having an inlet shaped and positioned to receive the product from said product-directing means, a dividing element positioned in said inlet in the path of the product from the product-directing means and shaped to separate the product into two streams of substantially equal volume and direct one stream through each treatment space, said product-directing means and said inlet forming a substantially unrestricted passageway to allow two substantially even streams of said product to flow freely through said treatment spaces, and means to rotate said treating device at a speed to cause said product to move along the surface portions within said treatment spaces and to be pressed thereagainst during such movement to inflict lethal trauma on all insect life in said product.

11. In apparatus for effecting the destruction of all insect life in a flowable product composed of individual solid parts, the combination of, product-directing means, a rotary treating device having three spaced parallel plates to provide two treatment spaces therebetween, said treating device having an inlet shaped and positioned to receive the product from said product-directing means, dividing means in said inlet extending into the path of the product from the product-directing means and shaped and positioned to provide entrance passageways to such treatment spaces which are substantially equal in cross-sectional area, said product-directing means and said inlet forming a substantially unrestricted passageway to allow two substantially even streams of said product to flow freely through said treatment spaces, and means to rotate said treating device at a speed to cause said product to move along the surface portions within said treatment spaces and to be pressed thereagainst during such movement to inflict lethal trauma on all insect life in said product.

FRANKLIN S. SMITH.